(12) United States Patent
Kelly

(10) Patent No.: US 10,233,603 B2
(45) Date of Patent: Mar. 19, 2019

(54) APPARATUS FOR CONTROLLING WATER FLOW FROM AN IRRIGATION DITCH

(71) Applicant: SMART SYPHON PTY LTD, St. Lucia (AU)

(72) Inventor: Gavin Andrew Kelly, St. Lucia (AU)

(73) Assignee: Smart Syphon Pty Ltd, St. Lucia (AU)

( * ) Notice: Subject to any disclaimer, the term of this patent is extended or adjusted under 35 U.S.C. 154(b) by 0 days.

(21) Appl. No.: 15/637,710

(22) Filed: Jun. 29, 2017

(65) Prior Publication Data
US 2018/0002880 A1    Jan. 4, 2018

(30) Foreign Application Priority Data

Jun. 30, 2016 (AU) .................................. 2016902588

(51) Int. Cl.
| | | |
|---|---|---|
| *E02B 13/02* | (2006.01) | |
| *B05B 17/04* | (2006.01) | |
| *E02B 11/00* | (2006.01) | |
| *A01G 25/00* | (2006.01) | |
| *E02B 13/00* | (2006.01) | |

(52) U.S. Cl.
CPC .............. *E02B 13/02* (2013.01); *B05B 17/04* (2013.01); *E02B 11/00* (2013.01); *A01G 25/00* (2013.01); *E02B 13/00* (2013.01)

(58) Field of Classification Search
CPC ............................ E02B 11/005; E02B 11/00
USPC ........ 251/352; 405/36; 285/181, 184, 147.1, 285/147.3
See application file for complete search history.

(56) References Cited

U.S. PATENT DOCUMENTS

| | | | | |
|---|---|---|---|---|
| 2,739,778 | A * | 3/1956 | Krone ................ | F16L 27/0861 137/615 |
| 4,822,080 | A * | 4/1989 | Darish ................ | F16L 27/0808 285/179 |
| 5,080,290 | A * | 1/1992 | Ostrom ................ | A01G 25/097 239/724 |
| 2016/0003394 | A1* | 1/2016 | Reasoner ............. | F16L 37/091 251/149.6 |

FOREIGN PATENT DOCUMENTS

DE    102011100848    * 11/2012

* cited by examiner

*Primary Examiner* — Sean D Andrish
(74) *Attorney, Agent, or Firm* — Smith IP Services, P.C.

(57) ABSTRACT

An apparatus for controlling water flow from an irrigation ditch can include a first conduit connecting portion adapted to be coupled with a first conduit, the first conduit having an opening for receiving water from the irrigation ditch, a second conduit connecting portion adapted to be coupled with a second conduit, the first and second conduit connecting portions being adapted to be arranged for allowing passage of the received water from the first conduit to the second conduit. In a first operating configuration, the first conduit connecting portion is positioned for elevating the opening of the first conduit at an elevated position to prevent water from being received into the opening. In a second operating configuration, the first conduit connecting portion is positioned for lowering the opening of the first conduit to allow water to be received into the opening.

14 Claims, 8 Drawing Sheets

APPARATUS FOR CONTROLLING WATER FLOW FROM AN IRRIGATION DITCH

CROSS-REFERENCE TO RELATED APPLICATION

This application claims priority to Australia Provisional Application No. 2016902588, filed 30 Jun. 2016.

BACKGROUND

This invention relates to apparatus for controlling the flow of water from an irrigation ditch.

The discussion of any prior art documents, techniques, methods or apparatus is not to be taken to constitute any admission or evidence that such prior art forms, or ever formed, part of the common general knowledge.

Farming or agriculture has been central to the rise and maintenance of the world's population. Key developments in the agriculture industry have allowed for the stabilization of the food supply, thereby allowing the development of more densely populated areas such as cities and towns.

The development of improved irrigation systems is just one of many advancements that have greatly altered the agriculture industry. One of the earliest forms of irrigation was to dig a water channel or row to direct the flow of water to the various crops in a field. Other early forms of irrigation included vertical wells and gently sloping tunnels, underground canals and a series of water-wheels. Today there are several different forms of irrigation which can be broadly categorized as surface irrigation, drip irrigation, sprinkler irrigation and center-pivot irrigation. Surface irrigation uses gravity to move water across the land, and can be characterized by the use of furrows, border strips or basins. Drip irrigation functions to deliver water near the root zone of plants and sprinkler and center-pivot irrigation systems utilize sprinkler heads in fixed positions or on wheeled bases or wheeled towers to supply water to plants.

Basin irrigation often requires a land area to be filled with water, which will then permeate the ground and possibly drain into an adjacent property. Basin irrigation is often utilized by farmers who are growing crops that need a significant amount of water and don't require any regulation of water supply beyond "flooding".

Furrow irrigation often utilizes several small channels or ditches in the field along with the gravitational pull created by a slope to move the water down the channel to the plants. Thus, basic furrow irrigation may be cost effective but it requires a significant amount of water flow planning because the amount of water provided is reduced as you move from the source. Further, furrow irrigation is not able to target a specific plant or a series of plants and instead is applied to a larger area of land as in many of the other irrigation methods outlined above. Recent developments in furrow irrigation have brought the use of various pipe systems to allow for a more efficient flow of water and to overcome some of the issues with water distribution. These include a gated pipe system that utilizes sliding gate valves in order to alter the flow of water from the water source. However, these gated valves require that a person, often a farmer or farmhand, walk through the fields with a gated-pipe valve opener and manually open and close all gates. Thus, even with the advances in gated pipe technology, there are still large inefficiencies in the furrow method of irrigation in order to obtain the optimal water flow for various areas of land.

Given the various disadvantages outlined above, a need exists for an improved controller for controlling flow of water out of an irrigation ditch or a furrow.

SUMMARY

In a first aspect, the invention provides an apparatus for controlling water flow from an irrigation ditch, the apparatus comprising: a first conduit connecting portion adapted to be coupled with a first conduit, the first conduit having an opening for receiving water from the irrigation ditch; a second conduit connecting portion adapted to be coupled with a second conduit; said first and second conduit connecting portions being adapted to be arranged for allowing passage of the received water from the first conduit to the second conduit; wherein in a first operating configuration, the first conduit connecting portion is positioned for elevating the opening of the first conduit at an elevated position to prevent water from being received into the opening, and in a second operating configuration the first conduit connecting portion is positioned for lowering the opening of the first conduit to allow water to be received into the opening.

In an embodiment, the apparatus comprises a bend portion extending between the first and second conduit connecting portions, said bend portion defining a passageway for allowing flow of fluid from the first conduit connecting portion to the second conduit connecting portion.

In an embodiment, the apparatus further comprises a pivoting arrangement for pivoting the opening of the first conduit in between the elevated position and the lowered position.

Preferably, the pivoting arrangement allows the first conduit connecting portion to pivot relative to the second conduit connecting portion and/or the second conduit.

In an embodiment, the pivoting arrangement comprises an outwardly extending lever member arranged to pivot the first conduit connecting portion, in between the elevated position and lowered position. Preferably, the lever member is positioned at a distal end relative to the first conduit connecting portion.

In an embodiment, the apparatus further comprises an annular ring member adapted for attachment to the bend portion and/or the second conduit connecting portion wherein the lever member is fixedly attached to the ring member and extends outwardly relative to the ring member. Preferably, the ring member is integrally formed with the lever member.

In an embodiment, the bend portion and/or the second conduit connecting portion comprises circumferentially arranged projections; and the annular ring member comprises corresponding recesses arranged circumferentially around the annular ring member such that during use the projections are received and retained in the corresponding recesses thereby fastening the lever onto the bend portion or the second conduit connecting portion.

In an embodiment, the apparatus further comprises a connector for fluidly coupling the second conduit connecting portion to the second conduit wherein the pivoting arrangement allows rotational movement of the second conduit connecting portion relative to the connector.

In an embodiment, the connector comprises: a first end, preferably a male connecting end, adapted for engagement with the second conduit connecting portion; and a second end, preferably female connecting end, adapted for being coupled with the conduit.

Preferably, the connector further comprises a profiled projection, preferably extends circumferentially around the outer wall of the connector, for seating the first end of the connector in an opening defined by the second conduit connecting portion wherein during use the profiled projection abuts the second conduit connecting portion.

In an embodiment, the apparatus further comprises a retaining nut for fastening the connector to the second conduit connecting portion, the retaining nut comprising helical threads for engaging complementary threads provided along an outer wall of the second conduit connecting portion.

In an embodiment, the apparatus further comprises a rotation limiting arrangement for limiting relative pivotal movement between the first conduit and the second conduit during use.

Preferably, the rotation limiting mechanism limits rotation of the bend portion relative to the second conduit coupled to the second conduit connecting portion.

In an embodiment, the rotation limiting mechanism comprises one or more stop members positioned circumferentially about the wall of the connecting member, wherein said stop members are arranged to engage the one or more portions of the ring member to limit relative rotational movement between the connecting nut and the second conduit connecting portion.

In an embodiment, the apparatus further comprises a fastening arrangement for fastening one or more tethers and allowing application of a pulling force on the one or more tethers to pivot the opening of the first conduit in between the elevated position and the lowered position.

In an embodiment, the apparatus further comprises a sealing assembly for each of the first and second conduit connecting portions to form a fluid-tight seal with the first and second conduits respectively. Preferably, the sealing assembly comprises a compression fitting arrangement for coupling each of the first and second conduits to the first and the second conduit connecting portions respectively.

In an embodiment, the compression fitting arrangement comprises a compression nut having helical threads for engagement with complementary threads provided along an outer wall of the connector; and a sealing ring such that during use the sealing ring is adapted for being positioned between the compression nut and an outer wall of the respective conduit coupled to the connector.

In another aspect, the invention comprises a system for controlling water flow from an irrigation ditch, the system comprising one or more of said apparatus as previously described and one or pulleys coupled to said tethers to apply a pulling force on the tethers to pivot the opening of the first conduit in between the elevated position and the lowered position.

In an embodiment, in the elevated position, the first conduit portion or the first conduit coupled to the first conduit connecting portion extends upwardly relative to the floor of the ditch for positioning the opening of the conduit in the elevated position.

In a preferred embodiment, the lever member further comprises a linking mechanism for linking the lever member to a drive pulley positioned relatively away from the lever member wherein during use operation of the drive pulley moves said lever member via the linking mechanism for varying the vertical elevation of the opening of the first conduit portion. Preferably the linking mechanism comprises a line that loops about the drive pulley. The line may also be looped about one or more guide pulleys.

In an embodiment, the apparatus further comprises a tether coupled with the lever member; and a drive pulley positioned for engagement with the tether; wherein operation of the drive pulley in a first direction pivots the opening of the first conduit to the elevated position and wherein operation of the drive pulley in a second direction that is opposite to the first direction pivots the opening to the lowered position.

In an embodiment, the drive pulley is positioned along a first upright member, the first upright member being located in the irrigation ditch and wherein at least one guide pulley is positioned along a second upright member. Preferably, the second upright member is positioned outside the irrigation ditch.

In one embodiment, the first connecting portion is fixedly attached to the second connecting portion to prevent relative movement between the first and second coupling portions.

In an alternative embodiment, the first connecting portion is movable independently relative to the second connecting portion.

Preferably, the lever member is positioned at a distal end relative to the first conduit coupling portion.

BRIEF DESCRIPTION OF THE DRAWINGS

The Detailed Description is not to be regarded as limiting the scope of the preceding Summary in any way. The Detailed Description will make reference to a number of drawings as follows.

DETAILED DESCRIPTION

Figure 1:
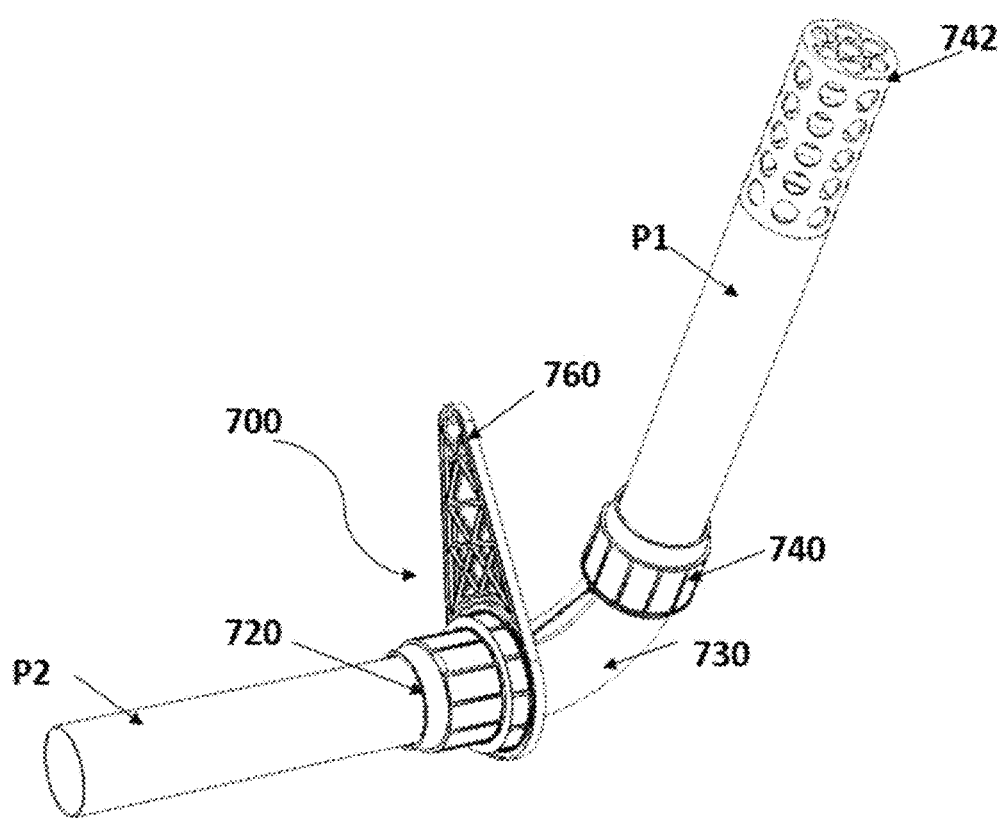
FIG. 1 is an isometric left view of an apparatus for controlling water flow from an irrigation ditch in the form of a pipe coupling assembly 700 in accordance with an embodiment of the present invention.

Referring to FIGS. 1 to 10, an apparatus for controlling water flow from an irrigation ditch in accordance with an embodiment of the present invention is illustrated. Specifically, the apparatus is provided in the form of a pipe coupling assembly 700 for controlling water flow from an irrigation ditch is illustrated. The coupling assembly 700 comprises a first pipe or conduit connecting portion 740, a second pipe or conduit connecting portion 720 and a pipe bend 730 extending between the first and second pipe or conduit connecting portions 740, 720. The pipe bend 730 defines a passageway for allowing flow of water from the first pipe or conduit connecting portion 740 to the second pipe or conduit connecting portion 720. During use, the each of the first and second pipe or conduit connecting portions 740 and 720 are coupled to respective pipes P1 and P2 (best shown in FIGS. 1, 9 and 10).

Referring to FIGS. 2 to 8, the coupling assembly 700 is illustrated in an uncoupled configuration. Specifically the pipes P1 and P2 are not shown in FIGS. 2 to 18 for the purpose of describing the working of the coupling assembly 700. A pivoting arrangement 760 is provided for pivoting the first conduit connecting portion 740 in between an in use elevated position and an in use lowered position, relative to the second conduit connecting portion 720. As described in the previous sections, providing the coupling assembly 700 in the aforementioned configuration allows the assembly to operate in at least two operating configurations. In a first operating configuration, the first connecting portion 740 is positioned in a raised configuration relative to the second connecting portion 720. In a second operating configuration, the second connecting portion 720 is positioned in a lowered configuration relative to the second connecting portion 720.

Figure 8:
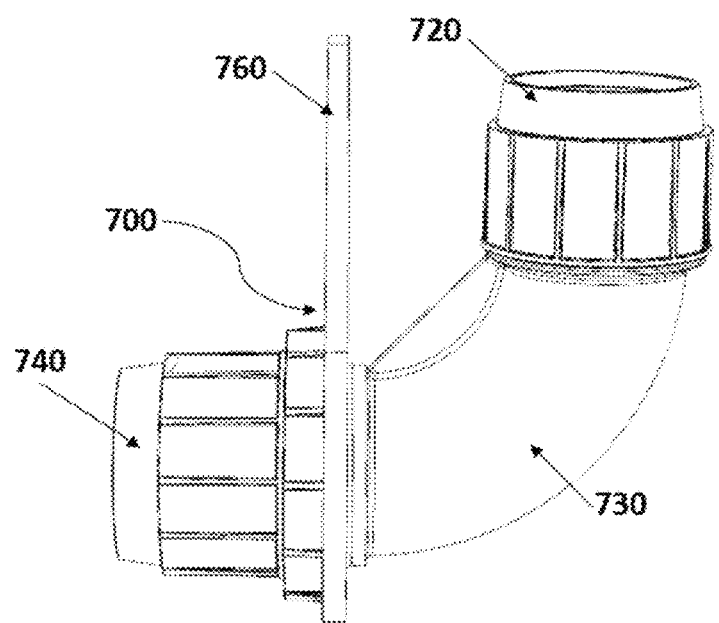
FIG. 8 is a left side view of the pipe coupling assembly 700.
Figure 9:
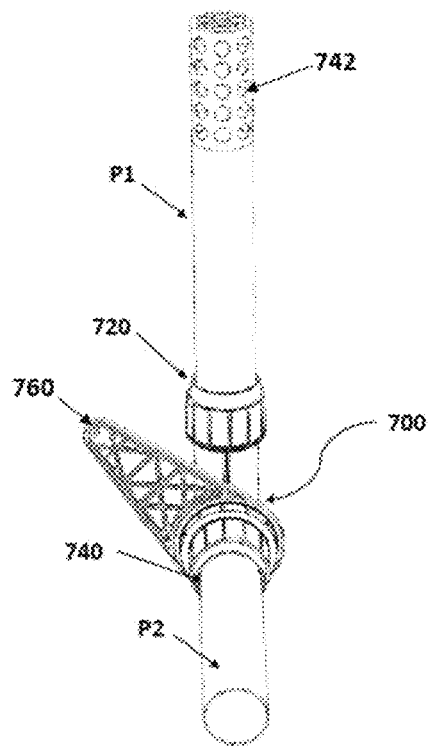
FIG. 9 is a frontal perspective view of the coupling 700 shown in a coupled configuration with pipes P1 and P2.
Figure 10:
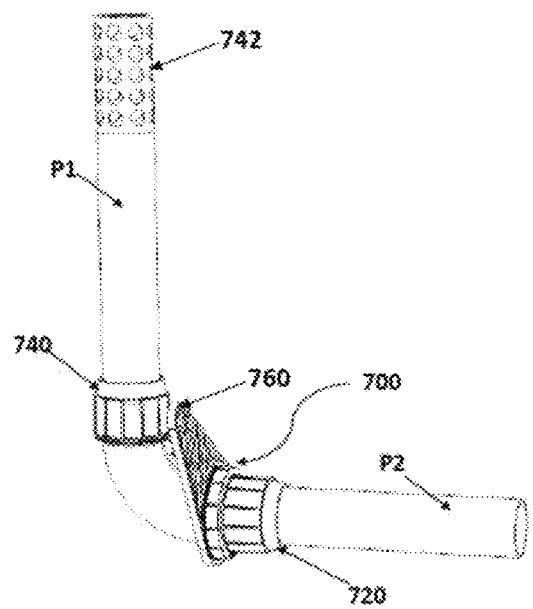
FIG. 10 is an in-use right-isometric view of the coupling 700 shown in a coupled configuration with pipes P1 and P2.
Figure 11:
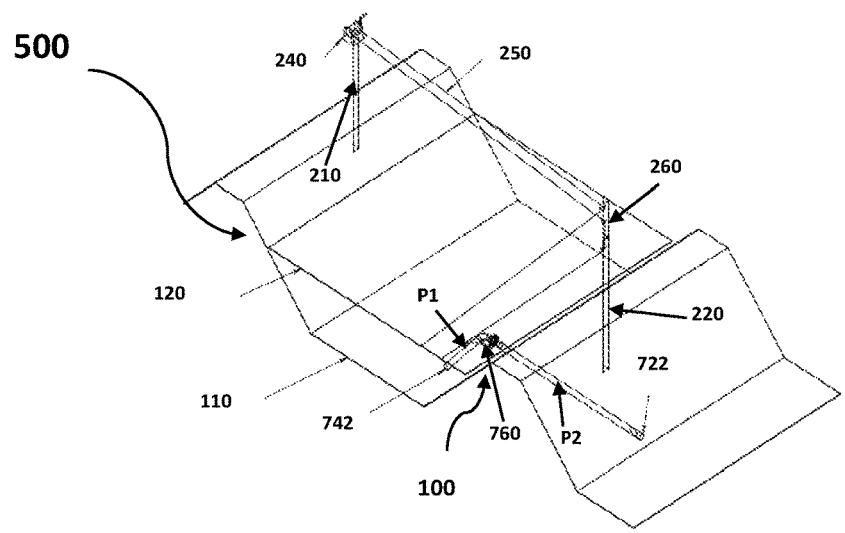
FIG. 11 illustrates a perspective view of a system 500 for using a plurality of the couplings 700 in a lowered or open position.
Figure 12:
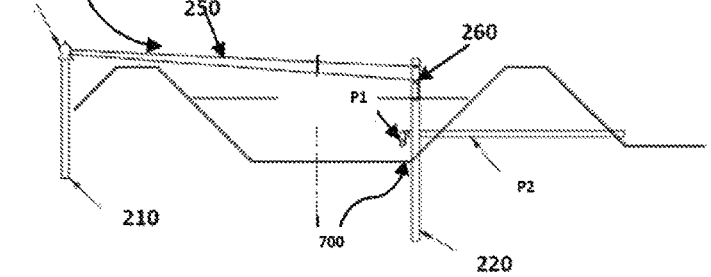
FIG. 12 illustrates a sectional side view of the system 500 for using a plurality of couplings 700 in the lowered or open position.
Figure 13:
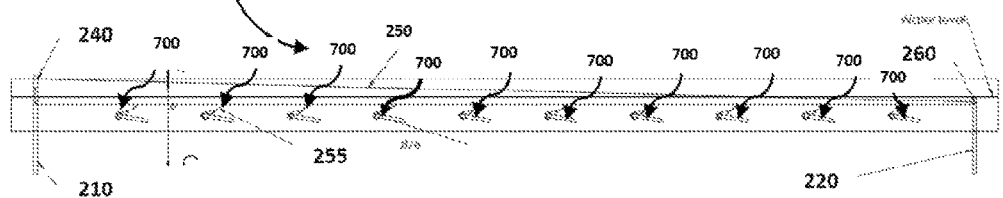
FIG. 13 illustrates a frontal view of the system 500 for using a plurality of couplings 700 in the lowered or open position.
Figure 14:
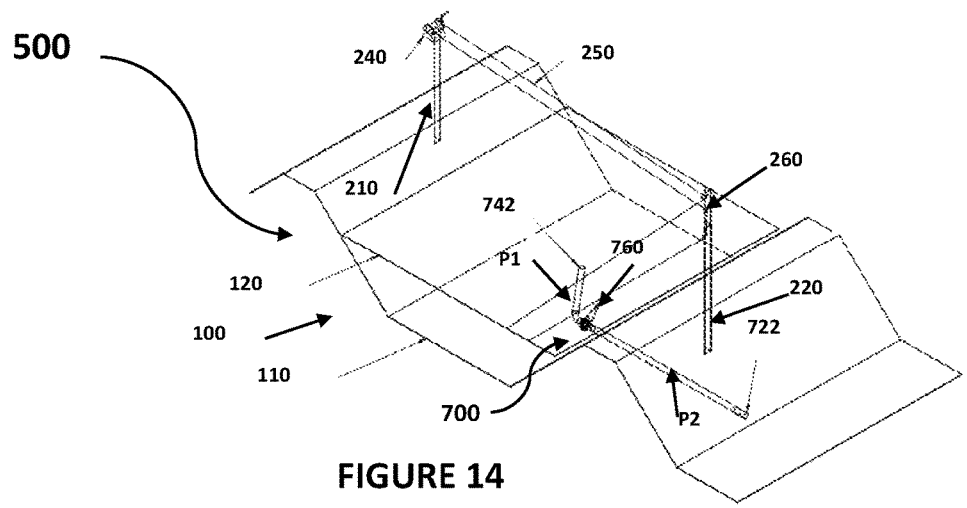
FIG. 14 illustrates a perspective view of a system 500 for using a plurality of couplings 700 in an elevated or closed position.
Figure 15:
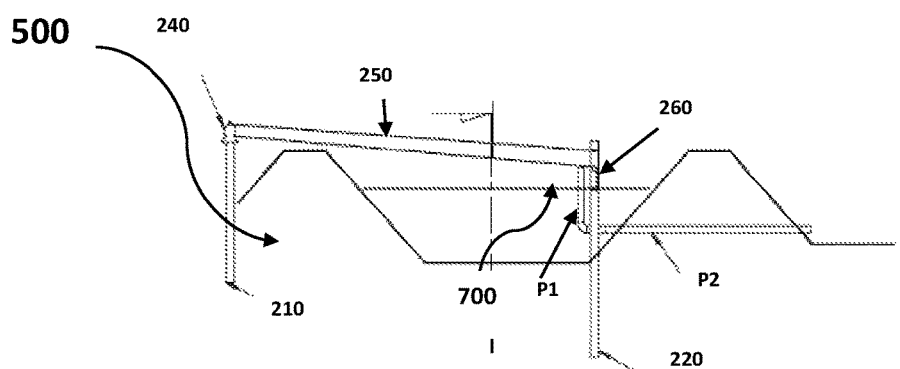
FIG. 15 illustrates a sectional side view of the system 500 for using a plurality of couplings 700 in the elevated or closed position.
Figure 16:
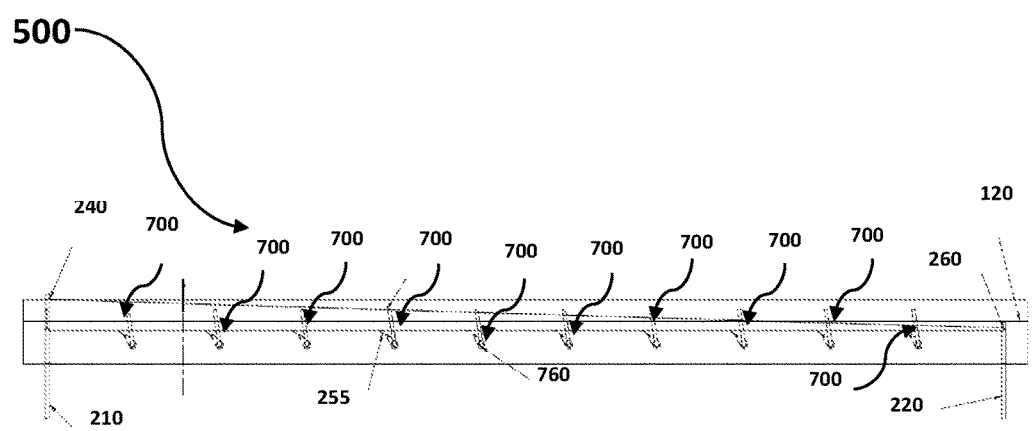
FIG. 16 illustrates a frontal view of the system 500 for using a plurality of couplings 700 in the elevated or closed position.

Referring to FIGS. 1, 8 and 9, when the first connecting portion 740 is in an elevated position, an opening 742 of the pipe P1 is positioned at an elevated position (relative to a water level of the ditch during use) for preventing water from being received into P1. However, when the first connecting portion 740 is lowered by utilizing the pivoting arrangement 760, the opening of pipe P1 is positioned below the water level of a ditch which results in water from the ditch being drained out, particularly if the coupling assembly 700, specifically pipe P2 is fluidly coupled with a suction generating device such as a suction pump.

Figure 2:
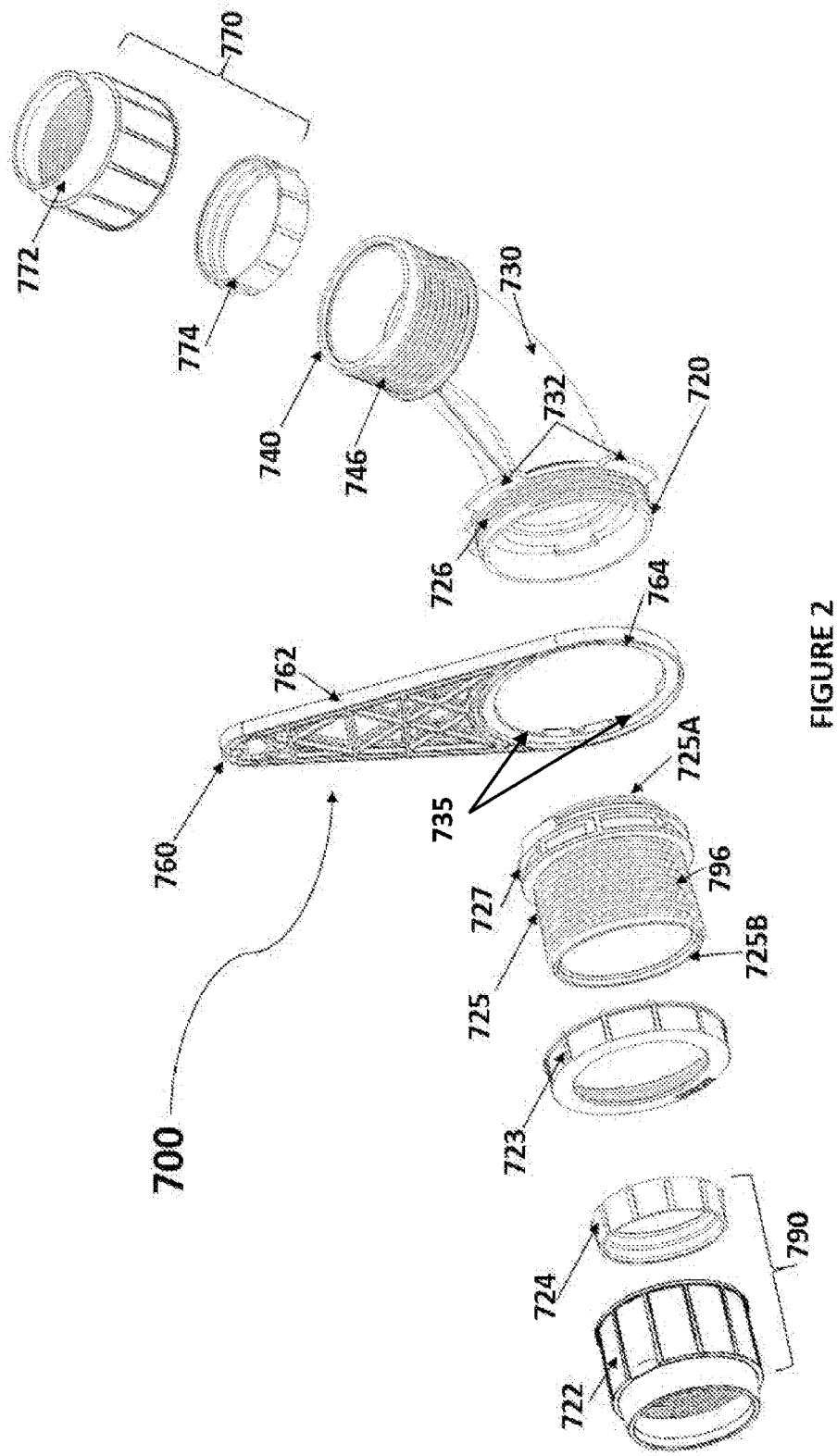
FIG. 2 is an exploded view of the pipe coupling assembly 700.
Figure 3:
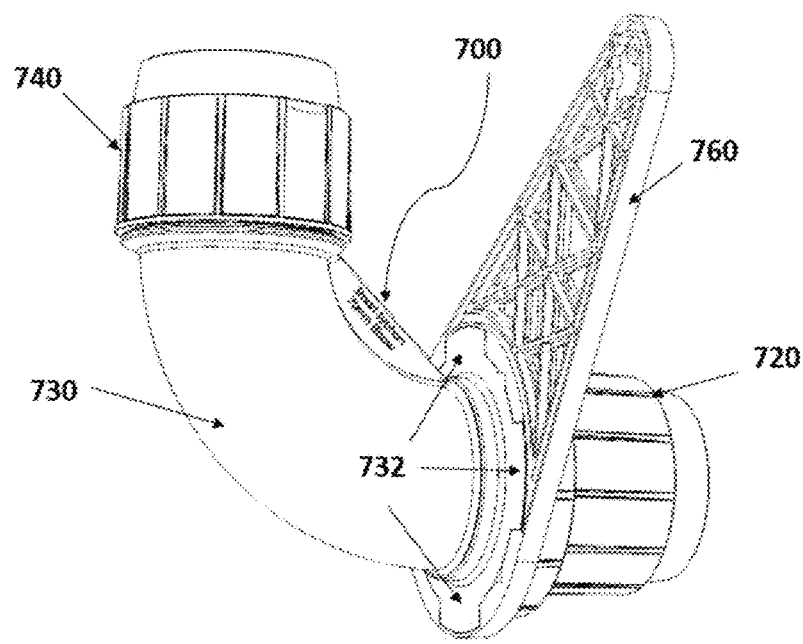
FIG. 3 is an isometric right view of the pipe coupling assembly 700.
Figure 4:
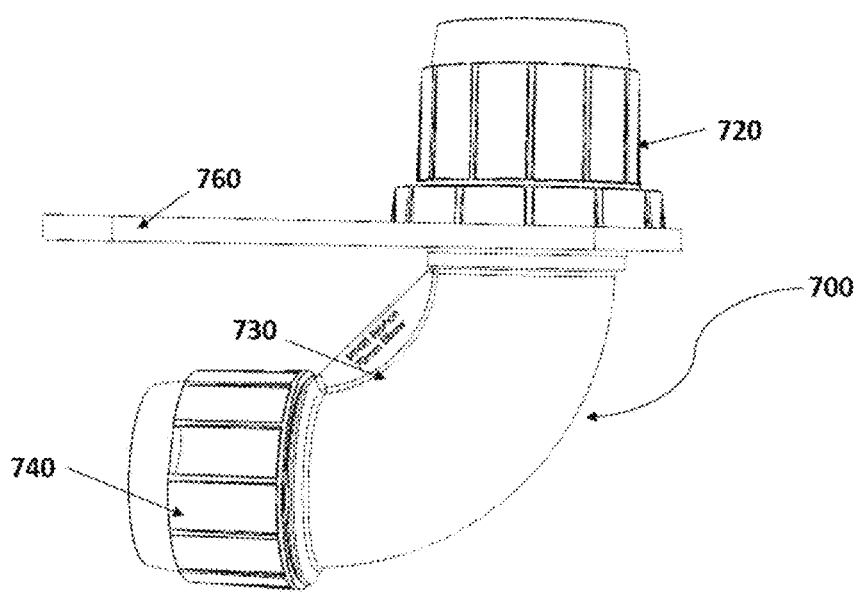
FIG. 4 is a bottom view of the pipe coupling assembly 700.
Figure 5:
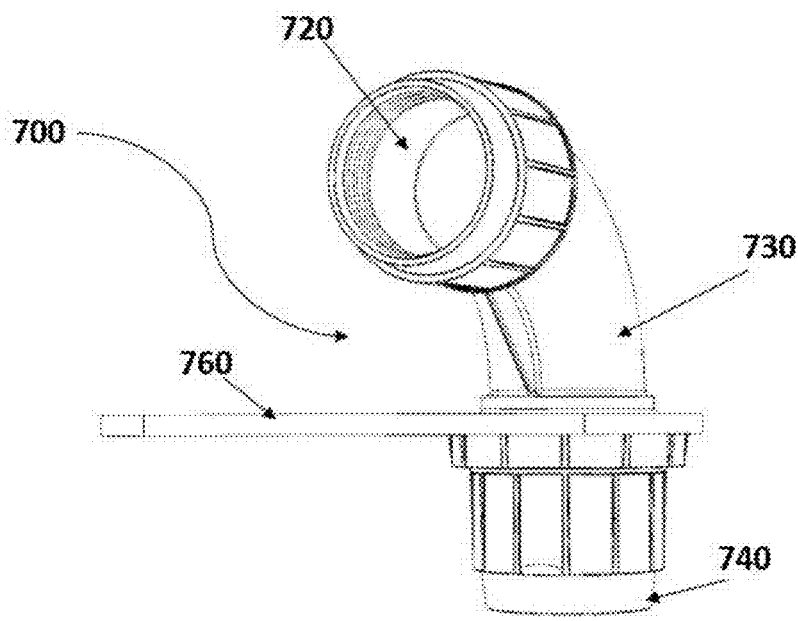
FIG. 5 is top view of the pipe coupling assembly 700.
Figure 6:
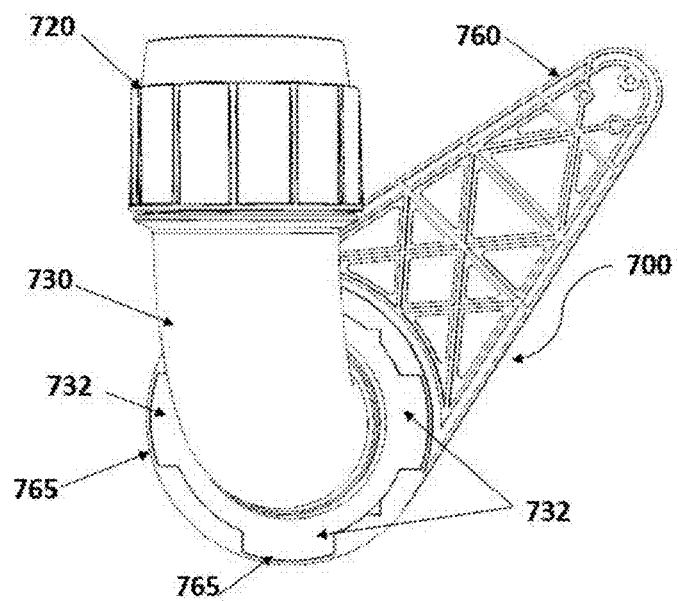
FIG. 6 is a rear view of the pipe coupling assembly 700.
Figure 7:
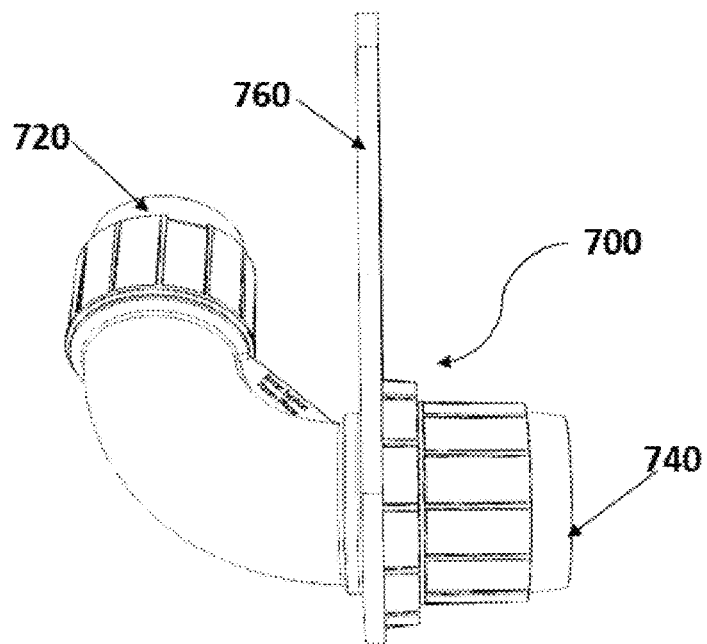
FIG. 7 is a right side view of the pipe coupling assembly 700.

Referring to FIG. 2, the pivoting arrangement 760 comprises an outwardly extending lever 762 that is substantially triangular in shape. The lever 762 extends outwardly relative to an annular ring member 764 adapted for attachment to the pipe bend 730. The pivoting arrangement 760, in the preferred embodiment, is positioned at a distal end relative to the first conduit connecting portion 740. As shown in FIGS. 2, 3 and 6 the pipe bend 730 comprises a rotation limiting arrangement including stop members in the form of circumferentially arranged projections 732 for engagement with corresponding recesses 735 provided along an inner wall of the annular ring member 764. The recesses 735 are also arranged circumferentially along an inner wall of the ring member 764 such that during use the projections 732 on pipe bend 730 are received and retained in the corresponding recesses 735 thereby limiting relative pivotal movement between the first conduit P1 and the second conduit P2 when the lever 762 incorporating the ring member 764 is fastened onto the pipe bend 730.

Referring to FIG. 2, each of the first and second pipe or conduit connecting portions 740 and 720 are provided with respective compression fitting arrangements for coupling pipes P1 and P2 to the first and second pipe or conduit connecting portions 740 and 720, respectively. The first compression fitting arrangement 770 comprises a compression nut 772 having helical threads for engagement with complementary threads 746 provided on an outer wall of the first pipe or conduit connecting portion 740. The compressing fitting arrangement 770 also comprises a resilient sealing ring 774 such that during use the sealing ring 774 is positioned between the compression nut 772 and an outer wall of conduit P1 (now shown in FIG. 12) coupled to the first pipe or conduit connecting portion 740. In the presently described embodiment, an end portion of the pipe bend 730 includes a male connecting portion which forms a part of the first connecting portion 740. In other alternative embodiments, the end portion of the pipe bend 730 forming the first connecting portion 740 may be provided in the form of a female connecting portion without departing from the scope of the present invention.

Referring again to FIG. 2, the second pipe connecting portion 720 comprises a connector 725 that inter-connects a lower end of the pipe bend 730 with the second pipe P2. Once again a compression fitting 790 is provided for coupling pipe P2 with the connector 725. The connector 725 comprises a first end 725A (a male connecting end) that is receivably engaged with an opening at the lower end of the pipe bend 730. The connector 725 also comprises a second end 725B (female connecting end) for being coupled with the conduit P2. The connector 725 also comprises a profiled projection 727 that extends circumferentially around the outer wall of the connector 725. During use, the first end 725A of the connector 725 is seated into the opening located at the lower end of the pipe bend 730. A retaining nut 723 is also provided for fastening the connector 725 to the second pipe connecting portion 720. The retaining nut 723 comprises helical threads which are configured for engaging complementary threads 726 provided along an outer wall of the second conduit connecting portion 720. During use, the movement of the lever 760 in a clockwise or counterclockwise direction results in the first connecting portion 740 being elevated or lowered relative to the second pipe connecting portion 720. During such pivoting of the pipe bend 730 and the first connecting portion 740, the movement of the lever 760 results in the pipe bend 730 (fixedly coupled to the lever 760) rotating relative to the connector 725 (and the fixedly coupled second conduit P2).

A second compression fitting arrangement 790 is provided for coupling pipe P2 to the connector 725 thereby allowing water to pass from pipe P1 to P2 by passing through the pipe bend 730. The compression fitting arrangement 790 comprises: a compression nut 722 having helical threads for engagement with complementary threads 796 provided along an outer wall of the connector 725; and a sealing ring 724 such that during use the sealing ring is adapted for being positioned between the compression nut and an outer wall of the respective conduit coupled to the connector.

Referring to FIGS. 10 to 15, a system 500 for controlling water flow out of an irrigation ditch 100 is illustrated. The system 500 comprises a plurality (10) of the pipe coupling assemblies 700 positioned along a furrow or an irrigation ditch 100.

As explained in earlier sections, each of the water controllers are operable in a first open configuration (FIGS. 10 to 12) in which the opening 742 of the pipe P1 is coupled to the first connecting portion 740 for each of the pipe coupling assemblies 700 positioned below the water level 120 in the ditch to allow water to be received into the first conduit P1 for each of the pipe coupling assemblies 700. A siphon or suction method may be used for suctioning the water out of the irrigation ditch when pipes P1 of the water controllers 500 are positioned in the lowered position. Similarly, the opening 742 for the pipe P1 coupled with the first connecting portion 740 for each of the pipe coupling assemblies 700 may be positioned above the water level to prevent water from being received into the first conduit P1 for each of the pipe coupling assemblies 700.

Advantageously, each of the pipe coupling assemblies 700 may be operated in tandem by way of coupling the lever portion 762 for each of the pipe coupling assemblies 700 to a remote drive pulley 240 as shown in the FIGS. 10 to 15. Each lever portion 762 for the pipe coupling assemblies 700 is fastened to a tether 255 by suitable fasteners. The tether 255 is connected to a tensioned rope 250 that is looped about the drive pulley 240 and also over one or more guide pulleys 260. Operation of the drive pulley 240 in a first direction rotates the line 250 about the drive pulley 240 and the guide pulleys 260 so that the lever portions 762 which are tethered to a lower side of the looped line 250 pivot, which in turn positions the openings 742 on the first conduit portions P1 for each pipe coupling assemblies 700 to the elevated position. Similarly, operating the drive pulley 240 in a second opposite direction pivots the lever portion 762 and the openings 742 (on the first conduit portions P1) for each pipe coupling assembly 700 to the lowered position.

Each irrigation ditch or furrow 100 is defined by a ditch floor 110 and enclosed on two sides by two opposed embankment walls (see for example FIG. 12) which assist with retaining water in the furrow or irrigation ditch. The water controllers 500 are positioned in close proximity to a first embankment wall as shown in FIGS. 10-11 and 13-14. In a preferred operating arrangement, the drive pulley 240 is arranged on an upright post 210 that is located away from the pipe coupling assemblies 700 in proximity to an opposite embankment wall. A first guide pulley 260 is positioned on another upright post 220 that is positioned along the first embankment wall and in close proximity to the pipe coupling assemblies 700. Each of the tethers 255 are linked with the respective lever portions 762 of the pipe coupling assemblies 700 is fastened to rope 250 which loops about the drive pulley 240 and the guide pulleys 260. The rope 250 is tensioned by the pulleys and runs around a remote guide pulley 260 which is not shown. The drive pulley 240 provides a winching arrangement that allows the rope 250 to be tensioned and moved along the guide pulleys, e.g. guide pulley 260, in a forward and reverse direction. The winching arrangement allows a person, often a farmer or farm-hand to wind the drive pulley 240 in a forward or reverse direction which causes the looped rope 250 to move so that the tethered pipe coupling assemblies 700 can be brought to the lowered position below the water level (for draining the irrigation ditch) or to the elevated position above the water level (for preventing drainage of water out of the irrigation ditch).

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

What is claimed is:

1. An apparatus for controlling water flow from an irrigation ditch, the apparatus comprising:

a first conduit connecting portion adapted to be coupled with a first conduit, the first conduit having an opening for receiving water from the irrigation ditch;

a second conduit connecting portion adapted to be coupled with a second conduit;

said first and second conduit connecting portions being adapted to be arranged for allowing passage of the received water from the first conduit to the second conduit;

a pivoting arrangement comprising an outwardly extending lever member arranged to pivot the opening of the first conduit connecting portion in between an elevated position and a lowered position;

a bend portion extending between the first and second conduit connecting portions and incorporating the lever member, said bend portion defining a passageway for allowing flow of fluid from the first conduit connecting portion to the second conduit connecting portion;

a connector for fluidly coupling the second conduit connecting portion to the second conduit, wherein the pivoting arrangement allows rotational movement of the second conduit connecting portion relative to the connector, the connector comprising a first end adapted for engagement with the second conduit connecting portion, and a second end adapted for being coupled with the second conduit; and a retaining nut for fastening the connector to the second conduit connecting portion, the retaining nut comprising helical threads for engaging complementary threads provided along an outer wall of the second conduit connecting portion, wherein in a first operating configuration, the first conduit connecting portion is positioned for elevating the opening of the first conduit to the elevated position to prevent water from being received into the opening, and in a second operating configuration the first conduit connecting portion is positioned for lowering the opening of the first conduit to the lowered position allowing water to be received into the opening.

2. The apparatus in accordance with claim 1 wherein the lever member is positioned at a distal end relative to the first conduit connecting portion.

3. The apparatus in accordance with claim 1 further comprising an annular ring member adapted for attachment to at least one of the bend portion and the second conduit connecting portion, and wherein the lever member is fixedly attached to the ring member and extends outwardly relative to the ring member.

4. The apparatus in accordance with claim 3 wherein the ring member is integrally formed with the lever member.

5. The apparatus in accordance with claim 4, wherein:

the bend portion or the second conduit connecting portion comprises circumferentially arranged projections; and the annular ring member comprises corresponding recesses arranged circumferentially around the annular ring member such that, during use, the projections are received and retained in the corresponding recesses thereby fastening the lever member onto the bend portion or the second conduit connecting portion.

6. The apparatus in accordance with claim 5, further comprising a rotation limiting mechanism that limits rotation of the bend portion relative to the second conduit coupled to the second conduit connecting portion.

7. The apparatus in accordance with claim 6 wherein the rotation limiting mechanism comprises one or more stop members positioned circumferentially about a wall of the second conduit connecting portion, wherein said one or more stop members are arranged to engage one or more recess portions of the ring member to limit relative rotational movement between the ring member and the second conduit connecting portion.

8. The apparatus in accordance with claim 1, wherein the connector further comprises a profiled projection for seating the first end of the connector in an opening defined by the second conduit connecting portion, and wherein during use the profiled projection abuts the second conduit connecting portion.

9. The apparatus in accordance with claim 8, wherein the profiled projection extends circumferentially around the outer wall of the second conduit connecting portion.

10. The apparatus in accordance with claim 1, further comprising a fastening arrangement for fastening one or more tethers to the lever member and allowing application of a pulling force on the one or more tethers to pivot the opening of the first conduit in between the elevated position and the lowered position.

11. The apparatus in accordance with claim 10, further comprising a sealing assembly for each of the first and second conduit connecting portions to form a fluid-tight seal with the first and second conduits respectively.

12. The apparatus in accordance with claim 11 wherein the sealing assembly comprises a compression fitting arrangement for coupling each of the first and second conduits to the first and the second conduit connecting portions respectively.

13. A system for controlling water flow from an irrigation ditch, the system comprising one or more of said apparatus in accordance with claim 12, and one or more pulleys coupled to said one or more tethers to apply a pulling force on said one or more tethers to pivot the opening of the first conduit in between the elevated position and the lowered position.

14. The apparatus in accordance with claim 1, wherein the first end of the connector comprises a male connecting end and the second end of the connector comprises a female connecting end.

* * * * *